C. T. MASON.
TELEPHONE TRANSMITTER.
APPLICATION FILED JULY 5, 1910.

1,007,883.

Patented Nov. 7, 1911.

WITNESSES:

INVENTOR.
Chas. T. Mason
BY
H. R. Van Deventer
ATTORNEY.

UNITED STATES PATENT OFFICE.

CHARLES T. MASON, OF SUMTER, SOUTH CAROLINA, ASSIGNOR TO THE SUMTER TELEPHONE MFG. CO., OF SUMTER, SOUTH CAROLINA, A CORPORATION OF SOUTH CAROLINA.

TELEPHONE-TRANSMITTER.

1,007,883.            Specification of Letters Patent.      Patented Nov. 7, 1911.

Application filed July 5, 1910. Serial No. 570,285.

*To all whom it may concern:*

Be it known that I, CHARLES THOMAS MASON, a citizen of the United States, residing at Sumter, in the county of Sumter and State of South Carolina, have invented certain new and useful Improvements in Telephone-Transmitters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telephone transmitters and consists of means whereby the sound receiving diaphragm is insulated from the circuit and permanently located in the front of the instrument without the use of resilient packing. I also provide a casing for inclosing the operative parts to protect them from mechanical injury and arrange this casing so that it is completely insulated from the circuit, yet carries all the operative parts of the instrument including the terminals for the connection of the circuit wires.

Figure 1:
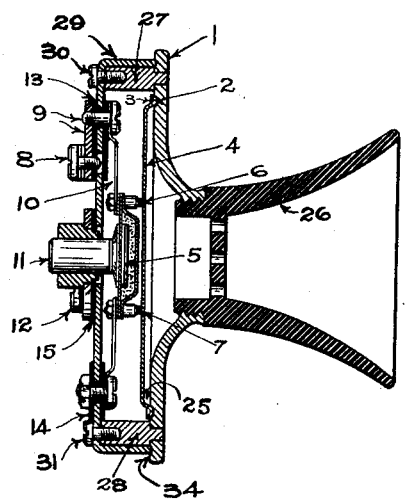
Figure 2:
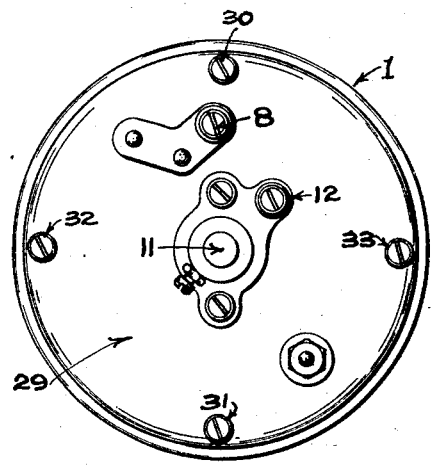
Figure 3:
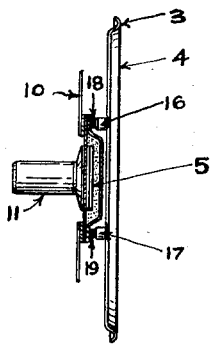
Figure 4:
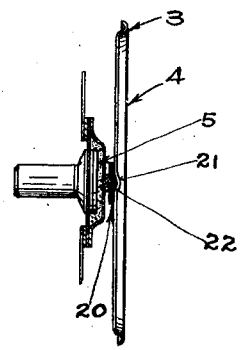

In the accompanying drawings Figure 1 is a vertical longitudinal section through a transmitter illustrating my invention. Fig. 2 is a rear view of a transmitter showing the rear casing with terminals mounted thereon. Figs. 3 and 4 show arrangements for insulating the diaphragm from the circuit.

Referring to Fig. 1 which shows a telephone transmitter of a well known type, I provide in the usual front plate 1 an annular groove 2 adapted to receive the flanged edge 3 of the usual sound receiving diaphragm 4. The fact that the edge 3 seats itself firmly in the groove 2 serves to locate the diaphragm centrally in the front plate. The resilient packing or rubber band heretofore used to insulate the diaphragm from the front is omitted as I provide other and more efficient means of insulation hereinafter described.

At 5 is shown a cell containing the variable resistance medium. This cell may be of any of the well known types, and constitutes the portion of the instrument through which an electric current must pass to be subjected to the varying impulses from the sound receiving diaphragm 4. Interposed between the cell and the sound receiving diaphragm I provide posts 6 and 7 which are tipped with suitable insulating material where they bear against the sound receiving diaphragm, consequently, current entering at terminal 8 flows through piece and screw 9 to the spring 10 to the cell forming one electrode (in this type of instrument) through the granular resistance medium in the cell to the other electrode and its support 11, and to terminal 12. Owing to the insulation at points 13, 14, and 15, and the tips 6 and 7, the circuit is confined entirely to the cell, its supporting members, and the terminals, the entire casing and diaphragm being insulated.

An alternate method of insulating the diaphragm is shown in Fig. 3. Here the pins 16 and 17 are attached to the sound receiving diaphragm and are equipped at their outer ends with insulating points 18 and 19 which bear against the cell 5, thereby accomplishing the same result as the construction shown in Fig. 1.

Fig. 4 shows another method of insulating the diaphragm, the insulation 20 being interposed between the diaphragm 4 and the cell 5, said insulation being independent of the cell or the diaphragm and being held in position by the depression 21 in the diaphragm, and point 22 on the cell or front electrode, and it is obvious that any form of cell can be used, the purpose of the insulation 20 simply being to separate the cell from the diaphragm.

By my improved arrangement corrosion of the diaphragm due to electrolytic action is eliminated, because the diaphragm does not form part of the circuit and moisture collecting between the diaphragm 4 and the front 1—as for instance in the space 25— has no tendency to interfere with the operation of the instrument.

The expense incident to the renewal of such perishable parts as oiled cloth, celluloid, or rubber, used heretofore, all of which rapidly deteriorate when subjected to moisture, is eliminated by the flange 3 firmly seated in the depression 2 in front plate 1. And in addition the diaphragm is held centrally in relation to mouth piece 26 and is therefore always in the best position to secure the maximum results.

To center the diaphragm it has been necessary to attach the cell to same, and, in the event of the diaphragm shifting position in the casing, a strain is thrown on the cell which interferes with the operation of the instrument.

By my improved construction groove 2 holds the diaphragm securely in place and it cannot shift. The necessity for attaching the diaphragm to the cell is also obviated, and all possibility of straining the cell is eliminated.

Attached to the front plate 1 are the posts 27 and 28 supporting the rear casing 29. This eliminates the bridge usually used and carries all the parts of the transmitter except the sound receiving diaphragm 4. This casing is secured to the posts by screws or other suitable means 30, 31, 32 and 33. A suitable flange or projection indicated at 34 is provided between the front plate and the rear casing to permit of the transmitter being placed in the usual back shell, which incloses terminals 8 and 12. In placing transmitters in the back shell it has often occurred heretofore that the connecting wires or cords have been jammed against the cell or sound receiving diaphragm thereby interfering with their operation, but it will be observed that with my improvement this is impossible, the rear casing 29 completely inclosing and protecting all of the vital parts.

Having thus described my invention, I claim and desire to secure by Letters Patent the following:

A telephone transmitter comprising in combination a front plate having an annular groove therein, near its outer edge, a diaphragm having a corrugation formed therein and adapted to fit into said groove, said corrugation being positioned on its outer edge portion, a back plate having a pan-like shape for inclosing the working parts of the transmitter, said back plate being arranged to rest on the back of said front plate, posts secured to said front plate, means for securing said back plate to said posts, a cell disposed in said back plate and insulated therefrom, a spring member secured to said back plate but insulated therefrom, and having its central portion arranged to actuate said cell, connections for putting the spring member the cell and binding post in series, a plurality of pins secured to said member and arranged to actuate the same, said pins being in insulated contact with said diaphragm and actuated thereby.

In testimony whereof I hereunto affix my signature in the presence of two witnesses.

CHARLES T. MASON.

Witnesses:
CARL T. MASON,
E. M. HALL.

Copies of this patent may be obtained for five cents each, by addressing the "Commissioner of Patents, Washington, D. C."